United States Patent
Jog

(10) Patent No.: US 10,081,885 B2
(45) Date of Patent: Sep. 25, 2018

(54) BI-COMPONENT FIBERS WITH EVOH ON THE SURFACE FOR CONCRETE REINFORCEMENT

(71) Applicant: Dow Global Technologies LLC, Midland, MI (US)

(72) Inventor: Prasanna K. Jog, Lansdale, PA (US)

(73) Assignee: Dow Global Technologies LLC, Midland, MI (US)

(*) Notice: Subject to any disclaimer, the term of this patent is extended or adjusted under 35 U.S.C. 154(b) by 615 days.

(21) Appl. No.: 14/536,875

(22) Filed: Nov. 10, 2014

(65) Prior Publication Data

US 2015/0133018 A1 May 14, 2015

Related U.S. Application Data

(60) Provisional application No. 61/903,453, filed on Nov. 13, 2013.

(51) Int. Cl.

| | |
|---|---|
| *D01F 8/10* | (2006.01) |
| *D04H 3/007* | (2012.01) |
| *D01F 8/06* | (2006.01) |
| *D04H 1/4309* | (2012.01) |
| *D04H 1/4291* | (2012.01) |
| *C04B 41/48* | (2006.01) |
| *C04B 20/00* | (2006.01) |
| *D01F 6/46* | (2006.01) |
| *C04B 28/02* | (2006.01) |
| *C04B 16/06* | (2006.01) |

(52) U.S. Cl.
CPC ............ *D01F 8/10* (2013.01); *C04B 16/0616* (2013.01); *C04B 20/0068* (2013.01); *C04B 28/02* (2013.01); *C04B 41/4861* (2013.01); *C04B 41/4869* (2013.01); *D01F 6/46* (2013.01); *D01F 8/06* (2013.01); *D04H 1/4291* (2013.01); *D04H 1/4309* (2013.01); *D04H 3/007* (2013.01); *D10B 2321/021* (2013.01); *D10B 2321/022* (2013.01); *D10B 2321/06* (2013.01); *D10B 2401/063* (2013.01); *D10B 2505/02* (2013.01); *Y10T 428/2929* (2015.01); *Y10T 442/641* (2015.04)

(58) Field of Classification Search
CPC ............ C04B 16/0616; C04B 20/0068; C04B 41/4861; C04B 41/4869; D01F 6/46; D01F 8/06; D04H 1/4291; D04H 1/4309

USPC ....................................................... 428/294.7
See application file for complete search history.

(56) References Cited

U.S. PATENT DOCUMENTS

| | | | |
|---|---|---|---|
| 3,315,021 A | 4/1967 | Luzzatto | |
| 3,316,336 A | 4/1967 | Smith | |
| 4,246,219 A | 1/1981 | Yu et al. | |
| 4,357,290 A | 11/1982 | Yu | |
| 4,414,276 A | 11/1983 | Kiriyama et al. | |
| 4,445,833 A | 5/1984 | Moriki et al. | |
| 4,801,630 A | 1/1989 | Chow et al. | |
| 5,037,884 A * | 8/1991 | Schellekens | ............... C08J 5/18 525/60 |
| 5,093,061 A | 3/1992 | Bromley et al. | |
| 5,290,626 A | 3/1994 | Nishioi et al. | |
| 7,025,825 B2 | 4/2006 | Pyzik et al. | |
| 2004/0081816 A1 | 4/2004 | Pyzik et al. | |
| 2014/0011030 A1* | 1/2014 | Kawakami | .......... C04B 20/0068 428/394 |

FOREIGN PATENT DOCUMENTS

| | | | | |
|---|---|---|---|---|
| EP | 0240167 A2 | 10/1987 | | |
| GB | 2021552 A | * 12/1979 | ............. C04B 16/06 | |
| JP | 57106563 A | 7/1982 | | |
| JP | 11350246 A | 12/1999 | | |
| JP | 2012193075 A | 10/2012 | | |
| JP | 2012193076 A | 10/2012 | | |
| JP | 2012211033 A | 11/2012 | | |
| WO | 9420654 A1 | 9/1994 | | |
| WO | WO 2006133150 A1 | * 12/2006 | ............. C04B 28/02 | |
| WO | WO2012133763 | * 10/2012 | | |

OTHER PUBLICATIONS

Villalpando-Olmos et al., "Performance of Polyethylene/Ethylene-Vinyl Alcohol Copolymer/Polyethylene Multilayer Films Using Maleated Polyethylene Blends," Polymer Engineering and Science, vol. 39, No. 9, Sep. 1999, pp. 1597-1603.

Liu et al., "Reactive Polymers for Blend Cmpatibilization," Advances in Polymer Technology, vol. 11, No. 4, 1992, pp. 249-262.

* cited by examiner

*Primary Examiner* — Vincent Tatesure

(57) ABSTRACT

The present invention provides bi-component polymeric macrofibers having an ethylene-vinyl alcohol (EVOH) outer component and a core or second component comprising a polymer blend of polypropylene grafted with maleic anhydride and polypropylene or polyethylene. The bi-component polymeric macrofibers provide excellent fiber reinforcement in concrete applications.

11 Claims, No Drawings

BI-COMPONENT FIBERS WITH EVOH ON THE SURFACE FOR CONCRETE REINFORCEMENT

The present invention relates to bi-component polymeric macrofibers for reinforcing concrete, the components having high adhesion to one another. More particularly, it relates to bi-component polymeric macrofibers having an outer component of ethylene-vinyl alcohol (EVOH) fiber and an olefin inner component or core comprising polypropylene grafted with maleic anhydride, and to concrete admixtures containing them.

Generally, concrete is a brittle material with high compressive strength but low tensile strength. Known attempts to improve the crack strength (tensile strength) and the toughness of the concrete require the introduction of reinforcing materials to the concrete. For example, rebar (steel rods) provide structural integrity but do not eliminate cracking; and metal mesh reduces cracking but cannot be used effectively to reinforce concrete of complex geometry. Previously, staple cut polymeric macrofibers were added to concrete to increase toughness, thereby reducing crack growth and increasing durability. Known fibers are polyolefinic (PP, PE etc.). Polyolefins are hydrophobic and do not form a strong bond with the concrete. This problem has so far been alleviated by mechanical means like denting the fiber surface, crimping & twisting etc. to increase the bonding with concrete.

U.S. Pat. No. 7,025,825B2 to Pyzik et al., discloses fibers having a polymeric core and a lower melting fusing-fraying polymer as at least a partial polymer sheath to improve the toughness of concrete while at the same time not creating other problems, such as low tensile strength. While the core and sheath polymers are compatible with one another and so do would not separate from each other on mixing, adhesion between the core and sheath polymers is not essential. However, fibers with fusing-fraying polymer sheaths exhibit necking failure, meaning that they pull out of concrete when the sheath polymer fails. The result is that the crack resistance and tensile strength of concrete containing them could be improved.

The present inventors have sought to solve the problem of providing polymer reinforcing fibers for concrete that enable users of concrete to further improve the crack resistance and tensile strength of concrete containing the fibers.

STATEMENT OF THE INVENTION

1. In accordance with the present invention, bi-component polymeric macrofibers for reinforcing concrete comprise as an outer component ethylene-vinyl alcohol (EVOH) polymer having from 5 mol % to 82.5 mol % of ethylene, preferably, at least 60 mol % and as a second component a polymer blend of, on one hand, polypropylene grafted with maleic anhydride and, on the other hand, polypropylene or polyethylene.

2. In accordance with the invention of 1, above, the polypropylene grafted with maleic anhydride in the second component of the bi-component polymeric macrofibers has a maleic anhydride proportion of from 0.06 to 0.25 wt. %, or, preferably, 0.06 to 0.08 wt. %, based on the total weight of the second component polymer blend solids.

3. In accordance with the invention of 1 or 2, above, the second component and the outer component of the bi-component polymeric macrofibers are situated in configuration chosen from second component islands in an outer component sea, second component core-outer component sheath, a segmented pie of the second component and the outer component, second component and outer component side by side, and fused microfilament fibers of each of the second component and the outer component.

4. In accordance with the invention of any of 1, 2, or 3, above, a composition of the bi-component polymeric macrofibers further comprises a wet concrete mixture.

5. In accordance with the invention of 4, above, the composition comprises from 0.002 wt. % to 0.4 wt. %, or, preferably, from 0.004 to 0.3 wt. %, or, more preferably, from 0.006 to 0.25 wt. % of the bi-component polymeric macrofibers, based on the total weight of the wet composition.

6. In another aspect of the present invention a bi-component nonwoven comprises the bi-component polymeric macrofibers of any of 1, 2 or 3, above, which bi-component nonwoven is continuous or non-continuous.

7. In accordance with the invention of 6, above, the bi-component nonwoven is non-continuous and the non-continuous bi-component nonwoven is chosen from slit fabric, cut fabric, bi-component nonwoven fiber bundles, chopped fabric, ribbons, braids, twists, and mixtures thereof.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(meth) acrylic" refers to acrylic, methacrylic or their mixtures.

All ranges are inclusive and combinable. For example, the term "a range of from 0.06 to 0.25 wt. %, or, preferably, from 0.06 to 0.08 wt. %" would include each of from 0.06 to 0.25 wt. %, from 0.06 to 0.08 wt. %, and from 0.08 to 0.25 wt. %.

As used herein, the term "ASTM" refers to publications of ASTM International, West Conshohocken, Pa. As used herein, the term "aspect ratio" refers to the ratio of the total length of a cut or stable fiber and its cross section width, with length as measured using a ruler with 1 mm resolution and cross section measured by sectioning the fiber perpendicular to its lengthwise axis, embedding the sectioned fiber into an epoxy resin matrix and curing the epoxy resin, followed by sectioning to remove the fiber in epoxy resin with a sharp blade and imaging the fiber under an SEM. If the cross section of the fiber is not a perfect circle, two characteristic dimensions are measured (for example, the major and minor axis of an ellipse) and then an average is taken as the cross section dimension.

As used herein, the phrase "wt. %" stands for weight percent.

The present invention provides bi-component fibers which are used as concrete reinforcement, wherein the adhesion between the outer component and second component polymers, for example, between core & sheath, improves concrete performance. As EVOH forms a strong bond with concrete, the present invention allows one to make fibers that improved the reinforced concrete containing them. The present invention in effect shifts the average residual (fiber) strength vs. fiber dosage curve upwards and thereby enables one to provide more reinforcement with less fiber dosage. Comparatively lower fiber dosages would thus economically serve to maintain the flow characteristic (slump) of a concrete admixture at acceptable levels. Surprisingly, the present inventors have found that it is the adhesion of the outer component polymer and the second component polymer blend of the bi-component polymeric macrofibers to one another, and not to concrete, that insures the most improvement in concrete crack resistance. Desirably, the fibers of the present invention delaminate from the concrete if they fail rather than by the fraying or wearing or necking in the fibers themselves.

The bi-component fibers of the present invention comprise two polymers, both of which can be fibers; they can comprise the second component as a fiber in an islands in a sea configuration in the outer component or in a core-sheath configuration with the outer component as a sheath; or they can comprise oriented strands of each of the ethylene-vinyl alcohol (EVOH) outer component and the second component polymer in a segmented pie configuration or a multilayer fiber comprising the outer component EVOH and the second component side by side, or, preferably, with the second component polymer sandwiched between two layers of the outer component EVOH polymer.

The outer component can comprise an ethylene-vinyl alcohol (EVOH) polymer having any molecular weight high enough to insure EVOH fiber formation, such as a weight average molecular weight (by Gel Permeation Chromatography using conventional vinyl or styrene polymer standards) of 50,000 or higher, or 70,000 or higher, and up to 10,000,000. It is not a wax.

Likewise, the inner component can comprise a polypropylene or polyethylene polymer blended with polypropylene grafted with maleic anhydride such that the blend polymer has any molecular weight high enough to insure EVOH fiber formation, such as a weight average molecular weight (by Gel Permeation Chromatography using conventional vinyl or styrene polymer standards) of 50,000 or higher, or 70,000 or higher, and up to 10,000,000. It is not a wax.

The outer component ethylene-vinyl alcohol (EVOH) polymer can comprise from 5 mol % to 82.5 mol % of ethylene, preferably, at least 60 mol % of ethylene, based on the total weight of the EVOH polymer. If the amount of ethylene is too low, the EVOH polymer will be too water sensitive or absorbent and will have too strong an adhesion to concrete whereas fiber delamination from concrete is the desired failure mode. If the amount of ethylene is too high, then adhesion of the EVOH polymer to concrete and to the second component polymer will suffer.

The bi-component fibers provide optimal average residual strength (ARS) results with only a small amount of polypropylene grafted with maleic anhydride (MAH) in the second component polymer blend. The second component polyethylene or polypropylene blended with polypropylene (PP) grafted with maleic anhydride can comprise from 0.06-0.25 wt. %, or, preferably 0.06-0.08 wt. % of grafted maleic anhydride, based on the weight of second component polymer blend solids. If the amount of grafted maleic anhydride is too low, the second component will suffer from insufficient adhesion to the outer component polymer; if the amount of grafted maleic anhydride is too high, then the second component fiber forming polymer is too cohesive to consistently form a fiber; and it is unevenly or inconsistently distributed into the bi-component polymeric macrofiber product.

The second component polymer blend can comprise from 1 wt. % to 50 wt. %, or, preferably, from 2 to 30 wt. %, based on polymer blend solids of the polypropylene (PP) grafted with maleic anhydride.

The most preferred fiber configuration for the best adhesion to concrete and between the outer component and the outer component is the islands in a sea configuration. EVOH is the "sea" material that surrounds islands made up of the second component polymer blend. A particularly preferred configuration having a high cross-sectional surface area is one in which the second component forms two or more segmented ribbons within a sea of the outer component. Island in a sea form fibers provide more contact area between the two polymers in a bi-component polymer fiber, leading to stronger adhesion between the two polymers. Also, the island in a sea form can provide fibrillation, a partial separation of the islands from sea which works as an energy absorbing mechanism under load. These inventive bi-component fibers do not exhibit necking which can interfere with the de-bonding mechanism between fiber and concrete.

Bi-component polymeric macrofibers may be formed having other configurations including, for example, core/sheath, segmented pie, side by side, and fused microfilament fibers. For example, in one embodiment of a side-by-side configuration, a three layer film is made with an A-B-A configuration where A=EVOH and B=second component polymer blend. This film is stretched in the machine direction and then cut into thin ribbons. These ribbons are equivalent to a filament. The filaments are then cut into staple fibers for use in concrete.

Regardless of configuration, the bi-component polymeric macrofibers of the present invention can have a cross section of any shape that accommodates both the second component and the outer component. For example, in a bi-component polymeric macrofiber having an islands in a sea configuration, a bi-component polymeric macrofiber having a rounded cross section can accommodate more islands of the second component than a bi-component polymeric macrofiber having a ribbon cross section.

The polymeric macrofibers of the second component of the present invention can have a cross section of any shape, including, for example, circular, oval, ellipsoid, triangular, rhomboid, rectangular, square, polygonal (having more than 3 sides), limniscate, ribbon-like or filamentous, and polylobal.

To make the bi-component polymeric macrofibers of the present invention, the fibers may be formed by well-known processes, such as melt spinning, wet spinning, or conjugate spinning. Any known fiber forming process will work so long as the process will not destroy or melt the fibers in process, especially the second component fibers which should not be melted in process. In processing, the fibers are shaped and may be drawn to a specified aspect ratio of length to diameter or largest width. For example, the bi-component polymeric macrofibers of the present invention may be extruded into any size, or length desired. They may also be extruded into any shape desired, such as, for example, cylindrical, cross-shaped, trilobal or ribbon-like cross-section. In another example, the bi-component polymeric macrofibers may be drawn when spun through two pairs of roller nips (each a pair of rollers), wherein the first pair of roller nip spins slowly and the second pair of roller nips spins a multiple of from 2× to 30×, preferably, from 7× to 20× the speed (rpm) of the first pair of roller nips.

The bi-component polymeric macrofibers of the present invention may have an aspect ratio (length to width) of from 10 to 100, or, preferably, from 30 to 80. The desired aspect ratio may be varied according to application; for example, in some demanding premanufactured concrete applications, thicker polymeric macrofibers may be made which have higher aspect ratios.

Individual configurations of the bi-component polymeric macrofibers of the present invention may be formed, as follows:

Islands-in-the sea fibers, also called matrix-filament fibers, include heterogeneous bicomponent fibers. Methods for producing islands-in-the sea fibers are described in U.S. Pat. No. 4,445,833. One such method comprises injecting streams of second component polymer into outer component polymer streams through small tubes with one tube for each second component polymer or core stream. The combined streams converge inside the spinneret hole and form one island-in-the sea conjugate stream.

Islands-in-the-sea configurations can be made by coextrusion methods described below in the description of core/sheath bi-component fibers, wherein multiple second component streams are co-extruded coaxially within a stream of the outer component such that the outer component forms a veil around all of the streams of the second component. Alternatively, fibers of the second component may be preformed and then introduced into a coaxially extruded stream of the outer component that is in a fluid or melt form. Such coaxial extrusion provides high fiber orientation levels.

Mixing the different polymer streams with a static mixer in the spinning process also makes island-in-the-sea bicomponent fibers. The static mixer divides and redivides the polymer stream to form a matrix stream with multiple cores. This method for producing island-in-the-sea fibers is described in U.S. Pat. No. 4,414,276.

Preferably, an islands-in-the-sea structure is employed when it is desirable to increase the modulus of the fiber, or reduce moisture regain in reinforced concrete applications.

Core/sheath bi-component fibers are those fibers where one of the components (core or second component) is fully surrounded by an outer component (sheath). The most common way to produce sheath-core fibers is a technique in which two polymer liquids (melts) are separately led to a position very close to the spinneret orifices and then extruded coaxially in core/sheath form. In the case of concentric fibers, the orifice supplying the "core" polymer is in the center of the spinning orifice outlet and flow conditions of core polymer fluid are strictly controlled to maintain the concentricity of both components when spinning. Modifications in spinneret orifices enable one to obtain different shapes of core or/and sheath within the fiber cross-section.

The core-sheath structure may preferably be employed when it is desirable for the surface to have the property of one of the sheath polymer, such as its adhesion to concrete.

Other methods for producing core/sheath bi-component fibers are described in U.S. Pat. Nos. 3,315,021 and 3,316,336.

Segmented pie bi-component fibers can be made by polymer distribution and/or spinneret modifications of the pack assemblies employed in the methods described for producing the side-by-side, core/sheath or islands-in-the-sea fibers. For example, by introducing a first polymer stream and a second polymer stream alternately through eight radial channels toward the spinneret hole instead of two channels, the resultant fiber is an eight-segment citrus-type fiber. If the spinneret orifice has the configuration of three or four slots on a circle (a common orifice configuration to produce hollow fibers), the fiber is a hollow citrus-type fiber with eight segments. The hollow citrus-type fiber can also be made by the use of special spinneret orifice configurations with a core/sheath spin pack, as described in U.S. Pat. Nos. 4,246,219 and 4,357,290.

Preferred methods for producing side-by-side bi-component polymeric macrofibers are described, for example, in U.S. Pat. No. 5,093,061. The methods are preferred because they provide products having a high fiber orientation and comprise (1) feeding two polymer streams through orifices separately and converging at substantially the same speed to merge side-by-side as a combined stream below the face of the spinneret; or (2) feeding two polymer streams separately through orifices, which converge at the surface of the spinneret, at substantially the same speed to merge side-by-side as a combined stream at the surface of the spinneret. In both cases, the velocity of each polymer stream at the point of merge is determined by its metering pump speed and the size of the orifice. The fiber cross-section has a straight interface between two components. Side-by-side fibers are generally used to produce self-crimping fibers, wherein each polymer component has different shrinkage characteristics.

The bi-component nonwoven of the present invention is made into a continuous nonwoven fabric and then slit or processed to make non-continuous nonwovens, such as a "dryer" type film for incorporation and dispersion into concrete. The nonwoven structure provides a unique geometry that is not flat or straight like that found in individual staple cut filament fiber or fused ribbons of filament fiber. The rough and irregular surface and non linear geometry, or crooked nature, of non woven fiber enables physical anchoring of the bi-component polymeric macrofibers into the matrix of the cement, thereby providing another mechanism in addition to a chemical bond at the interface. The bi-component nonwoven of the present invention provides concrete "friendly" consolidated fibers instead of loose cut staple fibers.

The bi-component nonwoven of the present invention can comprise mixtures of the bi-component polymeric macrofibers of the present invention with other fibers, such as reinforcing metal or polymer fibers.

The bi-component polymeric macrofibers and any other fibers used to make the bi-component nonwoven may have having the same or different diameters or configurations.

The continuous bi-component nonwoven fabric can be made into a non-continuous bi-component nonwoven with optimum dimensions (e.g. expandable diagonal slit mesh) or made into a sandwich of the fabric with bi-component polymeric macrofibers to enhance their delivery into the concrete.

The bi-component nonwoven of the present invention can be made by melt blowing (to make a melt blown) or spin bonding (to make a spun bonded) the bi-component polymeric macrofibers of the present invention to make a continuous bi-component nonwoven fabric sheet.

The fibers spunbond or melt blown into fabric have a crimped, texturized, or twisted fiber topology can then be cut into short individual sheets, or cut, sliced, slit, chopped or diced into non-continuous fabrics, sheets, ribbons, or fiber bundles, or the continuous nonwoven cab be bonded into multilayer laminates and then cut, sliced or slit into ribbons, stacked sheets or fiber bundles. The non-continuous ribbons, sheets, fabric or bundles may be subject to physical twisting or shaping into a cylindrical geometry or press formed into briquettes and then packaged into an exterior "sack" of a non-continuous nonwoven sheet of the same bi-component polymeric macrofibers that will break down and disperse when subjected to an alkaline and water rich environment slit non-woven.

Suitable concrete for use in the present invention may be any suitable concrete, such as those known in the art. Generally, concrete is a mixture comprised of Portland cement, aggregate and sand. Portland cement is used as is commonly understood in the art and defined by *Hawley's Condensed Chemical Dictionary* $12^{th}$ Ed., R. Lewis, Van Nostrand Co., NY, p. 239, 1993.

It is understood that the bi-component polymeric macrofibers of the present invention solid at ambient conditions and in the cured concrete.

The amount of reinforcing bi-component polymeric macrofibers in the concrete generally ranges from 0.02 volume % to 10 volume % of the dry or cured concrete article. Preferably, the amount of the reinforcing polymer is at least 0.1 volume %, more preferably at least 0.3 vol % or, most preferably, at least 0.5 volume % and up to 3 volume %, based on the total volume of the cured article.

Any reinforced concrete article may be made in the conventional manner by mixing the bi-component polymeric macrofibers of the present invention, water and concrete in any suitable manner. Preferably, the concrete dry components (e.g., cement, sand and gravel) are dry mixed first and then water is mixed to make a wet mixture. Subsequently, the reinforcing bi-component polymeric macrofibers are mixed with the wet concrete mixture for a sufficient time to form a homogeneous mixture. This mixture is then cast, shotcreted, molded or dispensed by any suitable method known in the art.

Generally, the wet concrete is mixed with the bi-component polymeric macrofibers of the present invention for at least 10 seconds to at most 20 minutes. Preferably, the mixing time is at least 30 seconds, more preferably at least 1 minute and up to 10 minutes, or, most preferably at most 5 minutes.

To the mixture, other additives useful in the formation of concrete may be added, such as those known in the art. Examples include superplasticizers, water reducers, rheology modifiers, silica fume, furnace slag, air entrainers, corrosion inhibitors and polymer emulsions.

The bi-component polymeric macrofibers of the present are suitable for use as a replacement for welded wire fabric (WWF), steel fibers, light rebar, and other secondary reinforcement used in concrete floors, elevated composite metal decks, soil-supported slabs, pavements, and in thin-walled precast applications.

The following examples are used to illustrate the present invention without limiting it to those examples. Unless otherwise indicated, all temperatures are ambient temperatures and all pressures are 1 atmosphere.

Mortar:

The mortar used in all pull-out tests comprises Cement (Portland type I), 27.82 wt. %, Sand (Quikrete™ All Purpose Sand, Berlin Township, N.J.) 59.65 wt. %, and Water (deionized (DI) room temp) 12.53 wt. %, based on the weight of the mortar, which has been mixed in a Hobart mixer for 3-5 minutes.

Single Fiber or Rod Pull-Out Test:

Used to screen the fibers to pick the best candidates for concrete reinforcement, this test measures the adhesion or the bonding strength of various materials to concrete. In this test, a single rod or fiber of polymer is embedded in a mortar cube. The mortar cubes are 50 mm×50 mm cross section and 25 mm deep (which matches exactly with the embedment length). The fiber or rod is embedded in the wet mortar cube and allowed to cure for 7 days in CTR at 73° F. and 60% RH. After curing, a part of the fiber is sticking out of the mortar and is used to grab and pull out. The sample is held in a special fixture attached to the INSTRON™ load testing machine (Norwood, Mass.). The fixture holds the mortar block steady and has a grip that captures the fiber and pulls it out of the cured concrete cube at a constant rate of slip (displacement). The force versus slip data is recorded. Four trials for each fiber or rod were tested to gauge the variability in the data; and the average of these were reported. The maximum force or load recorded as the bonding strength between the material and mortar, is normalized by dividing by the contact surface area between the fiber and concrete to generate interfacial shear stress, which is independent of the fiber or rod dimension. The following equations apply:

Interfacial shear stress (MPa)=Maximum load (N)/Contact area (mm$^2$); and,

Contact area=Perimeter of fiber cross section×Embedment length (fiber in concrete).

Care must be taken to account for undesirable fiber necking, wherein polymers start to yield around the maximum pull-out load and the rod or fiber separates from the mortar block by necking of the polymer which causes the fiber or rod to shrink laterally. In a pull-out wherein the polymer is dimensionally stable, the bond between the fiber or rod and the concrete around it breaks.

The pull-out tests were conducted on the fibers or rods indicated in Table 1, below. The rods had rectangular cross section with approximate dimensions of 12.7 mm width×3.2 mm thick. The embedment length was ~25 mm.

The fibers or rods indicated in Table 1, below were each made by compression molding the pellets or powder in a platen press. All are comparative Examples are not within the scope of the present invention. With the exception of Example 9A, all are one component fibers or rods.

The data for Comparative Example 8A, poly(ethylene-co-acrylic acid) (EAA) (10 wt % AA solids) fibers shows yield and necking interfering with the pull-out. The evidence of this can be seen in the shape of its pull-out curve (not shown) plotting load on the vertical axis vs. extension on the horizontal axis; the curves show a prolonged flat portion near the maximum load, evidencing no added resistance to extension after reaching a certain pull out load, followed by a sudden drop in load at pull-out. Desirably, fibers or rods tested gave pull-out curves indicated no yield and necking at pull-out as the load required to extend continued to rise until maximum load was reached, and then the entire fiber pulled out. So, the value of interfacial shear stress for a poly(ethylene-co-acrylic acid) (EAA) (10 wt % AA solids) rod was not reliable. When the test was performed on the Comparative Example 9A bi-component 1.5 mm perimeter fiber with the poly(ethylene-co-acrylic acid) (EAA) (10 wt % AA solids) fiber sheath on the surface, the perimeter was used to calculate the reported interfacial shear stress.

The results of the rod pull-out test in Table 1, below, show that ethylene-vinyl alcohol (EVOH) fibers in Comparative Example 1A have more than twice the bonding strength to concrete as compared to polypropylene. The EVOH rods did not have any special surface treatment to improve frictional or mechanical bonding, so the pull out test truly measures the effect of that material alone. Accordingly, EVOH was the best polymer for a bi-component fiber sheath. The fibers in Comparative Example 4A and the bi-component fibers in Comparative Example 9A appear to be the closest art.

TABLE 1

Pull out Results - Interfacial Shear Stress For One Component Polymer Rods and Fibers

| Example* | Material | Polymer Description | Interfacial Shear Stress (MPa) |
|---|---|---|---|
| 1A | EVOH | Poly(ethylene-co-vinyl alcohol), 48 mol % ethylene | 1.64 |

TABLE 1-continued

Pull out Results - Interfacial Shear Stress For
One Component Polymer Rods and Fibers

| Example* | Material | Polymer Description | Interfacial Shear Stress (MPa) |
|---|---|---|---|
| 2A | EAA | Acrylic Acid modified PE (6 wt % AA), density 0.95 g/cc, MP = 127° C. | 0.55 |
| 3A | PP-MAH | MAH modified PP (0.2 wt % MAH), density = 0.91 g/cc, MP = 157° C. | 0.82 |
| 4A | PP-AA | Acrylic Acid modified PP (6 wt %), density = 0.91 g/cc, MP = 161° C. | 1.06 |
| 5A | PE-MAH | MAH (1.2 wt. %, solids) modified PE | 0.63 |
| 6A | HDPE | Polyethylene, MP = 130° C., density = 0.95 g/cc | 0.40 |
| 7A | PP | Polypropylene, MP = 160° C., density = 0.9 g/cc | 0.79 |
| 8A | EAA | Poly(ethylene-co-acrylic acid), 10 wt % AA, density 0.938 g/cc, MP = 100° C. | 0.20 |
| 9A | PP/EAA Bi-component fiber | Poly(ethylene-co-acrylic acid), 10 wt % AA, solids, on surface, PP in core | 1.05 |

*All examples are Comparative

Average Residual Strength (ARS):

As measured by the test ASTM C-1399 (2010), this test measures the post-cracking strength of fiber reinforced concrete beams and relates to the ability of the fiber to reinforce concrete. First, the indicated fibers at the indicated dosage in Table 2, below, were mixed with concrete comprising Type 1 portland Cement, 14.73 wt. %, #57 Limestone coarse aggregate, 44.70 wt. %, sand (Torpedo) 32.76 wt. %, and water 7.81 wt. %. The wet concrete was sampled and the beams were molded. The beam dimensions were about 100 mm (deep)×100 mm (Wide)×355 mm (Long). The beams were cured for 28 days. The cured beam was put into a specially made fixture and cracked using the third-point loading apparatus equipped with deflection sensors (LVDT, Linear Variable Differential Transformer) to measure the beam deflection at the mid-span portion of the beam. Thus, a steel plate was put underneath the beam during an initial loading cycle to control the rate of deflection when the beam cracked. While usually a through crack appears near the center of the beam, the initial load value (used to crack the beam) had no significance because of the supporting steel plate underneath. After the beam was cracked, it was removed and reloaded into the apparatus but without the steel plate. The displacement sensor was adjusted to touch the beam at mid-span. The load vs deflection data was collected. The average residual strength for each beam was calculated using the loads determined at reloading curve deflections of 0.50, 0.75, 1.00 and 1.25 mm.

The average residual strength was computed as follows:

$$ARS = \left(\frac{P_1 + P_2 + P_3 + P_4}{4}\right) \times k,$$

wherein:

$k=L/bd^2$; ARS means average residual strength; $P_1$, $P_2$, $P_3$, $P_4$ are recorded loads at the specified reloading curve deflections; L is beam span length; b is the average width of beam; and d is the average depth of beam. The ARS value was calculated for each beam tested and an average of 3 to 5 trials, each using a new beam was taken to get the reported ARS value at a particular fiber loading.

As shown in The PP fibers were made in the same fiber spinning/draw equipment and had similar size (length, diameter) as the bi-component fibers. The low ARS result also suggest that failure in the test occurs in the fiber and not between fiber and concrete, i.e. because of poor adhesion between PP and poly(ethylene-co-acrylic acid) (EAA) (10 wt. % AA solids) polymer. This was confirmed by completely breaking the beam from the ARS test by lightly tapping it with a mallet, separating the two parts of the beam and looking at the fibers sticking out of the surface are cut and viewed using an optical microscope. In this way, it was confirmed that the sheath of the core-sheath fibers of Comparative Example 2B was removed from the fiber core during testing. While the original fibers clearly show the poly(ethylene-co-acrylic acid) (EAA) (10 wt. % AA solids) polymer sheath surrounding the PP core, in the pulled out fibers, the sheath is visibly gone. This, the poly(ethylene-co-acrylic acid) (EAA) (10 wt. % AA solids) polymer layer separated from the PP layer before the pull-out of the entire fiber from concrete. This lowers the ARS value.

Table 2, below, the ARS value of PP/poly(ethylene-co-acrylic acid) (EAA) (10 wt. % AA solids) polymer bi-component fibers in Comparative Example 2B is much less than that of polypropylene (PP) monofilament fibers. The PP fibers were made in the same fiber spinning/draw equipment and had similar size (length, diameter) as the bi-component fibers. The low ARS result also suggest that failure in the test occurs in the fiber and not between fiber and concrete, i.e. because of poor adhesion between PP and poly(ethylene-co-acrylic acid) (EAA) (10 wt. % AA solids) polymer. This was confirmed by completely breaking the beam from the ARS test by lightly tapping it with a mallet, separating the two parts of the beam and looking at the fibers sticking out of the surface are cut and viewed using an optical microscope. In this way, it was confirmed that the sheath of the core-sheath fibers of Comparative Example 2B was removed from the fiber core during testing. While the original fibers clearly show the poly(ethylene-co-acrylic acid) (EAA) (10 wt. % AA solids) polymer sheath surrounding the PP core, in the pulled out fibers, the sheath is visibly gone. This, the poly(ethylene-co-acrylic acid) (EAA) (10 wt. % AA solids) polymer layer separated from the PP layer before the pull-out of the entire fiber from concrete. This lowers the ARS value.

TABLE 2

ARS values of PP and PP/poly(EAA) (10 wt. % AA solids) polymer core/sheath fibers

| Comparative Example | Fiber | Dosage (kg/m³) | ARS (MPa) |
|---|---|---|---|
| 1B | PP only Monofilament | 3.56 | 0.81 ± 0.21 |
| 2B | PP/poly(ethylene-co-acrylic acid) (EAA) (10 wt. % AA solids)polymer (Core/Sheath) bi-component | 3.56 | 0.34 ± 0.09 |

Peel Test:

Shows that interlayer adhesion is another important parameter in assessing bi-component fibers. In the test, adhesion was measured between the two polymers in a given fiber. First, a trilayer coextruded cast film of sheath polymer A and core polymer B was made as an A-B-A film. Dyes were added to differentiate between the polymers A and B. Then, a pure film of material A was attached to each side the A-B-A film using compression molding with an offset between the pure A films and the A-B-A film; the resulting structure was A/A-B-A/A. In the structure, the overhanging part of the pure A film provided "ears" to help pull the A and B layers of the A-B-A film apart. The right side the A-B-A film (away from the "ears") was not exposed to the heat and pressure of the compression molding so that this portion of the A-B-A film gives more accurate adhesion force between the layers A and B when not influenced by heat & pressure. In the test, each of the ears of the compression molded test film were gripped and pulled apart with an Instron™ testing machine equipped with a grip device. The machine measures load vs. displacement as the A-B layers were being separated. At the end of the peel test, a visual observation was made to confirm whether the failure was adhesive failure, where there is a clean separation between the A & B polymer films with no residue of polymer A on the polymer B film and vice versa, or cohesive failure (desired), which is defined as not being adhesive failure. Results from 3 to 5 separate films were recorded for each Example and the average of the test results for these were recorded as the peel test result; 5 trial attempts were made for each Example yet trial results were discarded where unreliable, such as when the grip slipped on the testing machine.

To minimize any effect from the compression molding, the reported peel test force was taken as an average of 3 to 5 force values taken for each test film towards the end of each peel experiment, past the point at which the test film sealed by compression mold fails (in the case of cohesive failure) or when force vs. displacement curve becomes flat (in the case of adhesive failure). The peel force is normalized by factoring in the width of the film to get peel adhesion force value in the units of force/length. Because the cohesion between polymers A and A could be stronger than adhesion between polymers A and B, peeling is expected to preferentially start at the A-B interface, showing adhesive failure. Adhesive failure indicated weaker bonds between polymers A and B than a cohesively failed interface; so in adhesive failure, the force recorded was the force measured when it leveled off during peel testing. When there was adhesive failure at the interface between films of polymer A and B, the peel force leveled off at failure and, once force reached a constant, there was no more resistance to it. In the case of cohesive failure, the force did not level off during the peel and the polymer layers could not be separated completely. So, the reported average force represents the max force level measured in the case of cohesive failure and the force at which the force level itself leveled off in the case of adhesive failure.

Where a mechanical failure occurred in the layer being pulled (polymer A), and the ears broke or left as a residue of polymer A on B, the failure was recorded as cohesive failure.

Table 3A, below, shows the peel adhesion test summary of various polymer combinations. Like failures are comparable, so cohesive failures can be compared to other cohesive failures. When comparing between two adhesively failed combinations, the one with higher force would be considered stronger. For example, the observed adhesion between high density polyethylene (HDPE)/poly(ethylene-co-acrylic acid) (EAA) (10 wt. % AA solids) polymer was much stronger than that between polypropylene (PP)/poly (ethylene-co-acrylic acid) (EAA) (10 wt. % AA, solids) polymer in Comparative Example 3C; thus, the poor adhesion between PP/poly(ethylene-co-acrylic acid) (EAA) polymer was confirmed.

TABLE 3A

Peel Adhesion Test Summary

| Example | Polymer 1 | Polymer 2 | Peel force (N/mm) | Type of failure |
|---|---|---|---|---|
| 1C* | PP | PE-g-MAH (1.2 wt. % MAH, solids) | 0.31 | Adhesive |
| 2C* | HDPE | poly(ethylene-co-acrylic acid) (EAA) (10 wt. % AA, solids) | 0.62 | Adhesive |
| 3C* | PP | poly(EAA) (10 wt. % AA, solids) | 0.05 | Adhesive |
| 1 | EVOH | PP + PP-g-MAH[1] | 0.53 | Cohesive |

*Comparative Example; 1. Blend ratio 80/20 (w/w solids) PP/PP-g-MAH - the MAH level is 1 wt. % (solids, of the total polymer blend).

The polypropylene (PP) surface and PE-g-maleic anhydride (MAH) materials of Comparative Example 1C and the PP surface poly (EAA) materials of Comparative Examples 2C and 3C were used as controls to assess the performance of articles having polypropylene-polymer materials adjacent to EVOH. This data is summarized in Table 3A, above. The Table 3A shows that EVOH and the polypropylene blend with MAH grafted polypropylene have superior adhesion to one another.

The peel test is further characterized by the force measured after the compression molded films (cohesive failure) separate. As shown in Table 3B, below, the inventive compositions cohesively fail and give better results withstanding much higher peel force than the closest art.

TABLE 3B

Peel Test Forces Measured as Adhesion

| | PP/poly(ethylene-co-acrylic acid) (EAA) (10 wt. % AA solids) Peel extension (mm) | Force (N) |
|---|---|---|
| Example 3C | 195.3 | 1.04 |
| | 200.1 | 1.02 |
| | 215.0 | 1.11 |
| | 217.1 | 1.12 |

| | PP + PP-g-MAH/EVOH Peel extension (mm) | |
|---|---|---|
| Example 1 | 162.5 | 6.00 |
| | 167.3 | 6.56 |
| | 172.6 | 7.55 |
| | 175.9 | 8.31 |
| | 178.8 | 9.19 |
| | 199.8 | 17.40 |
| | 201.5 | 10.34 |

Because adhesion between different polymers is critical, the inventive second component polymer is a blend of PP+PP-g-MAH, which as shown in Tables 3A and 3B, above, has very good adhesion to EVOH. Table 3B reveals little adhesion between PP and EAA polymers in Comparative Example 3B measured as the force required to separate them. The Example 1 peel results show strong adhesion between EVOH and PP-PP-g-MAH.

Bi-Component Fiber Pull Out Test:

To assess their performance in concrete reinforcement, a bi-component fiber pull out test was performed on the fibers, as indicated in Table 4, below. A single bi-component fiber was embedded in the mortar cube. Each of the bi-component polymeric macrofibers indicated in Table 4, below, was made using fiber spinning equipment comprising, moving downstream, extruders, distribution plate, die, take up roll and winder. The fibers were subsequently drawn by using two sets of roller nips (as described above); the resulting macrofibers each had an Aspect ratio of 34±10%.

The composition of the bi-component polymeric macrofibers in Examples 2, 3 and 4 in Table 4, below, were, for the outer component EVOH a copolymer of 48 mol % ethylene, 52 mol % vinyl alcohol (MP=157° C.). The second component comprises a blend of polypropylene (PP) (MP=160° C.) and PP-g-maleic anhydride (MAH) (MP=160° C., MAH graft level 1 wt. %, solids of PP-g-MAH polymer). The PP/PP-g-MAH blend weight ratio is 95/5 for the islands in a sea INS fibers and 80/20 for the core/sheath fibers.

In Table 4, below, the fibers were drawn through a pair of roller nips wherein the second set of roller nips and the reference to "9x" and "11x" indicates the ratio of the roller nip speeds, i.e. that the second set of roller nips was 9x or 11x times as fast in rpm as the first (slow) set of roller nips.

The islands in a sea (INS) bi-component polymeric macrofibers of Examples 2 and 3 were the best performers. The fibers in Comparative Examples 1D and 2D gave strong interfiber adhesion but did not perform as well in concrete. The islands in sea (INS) bi-component polymeric macrofibers of Examples 2 and 3 and the core/sheath (C/S) bi-component polymeric macrofibers with EVOH on the surface in Example 4 perform dramatically better than the Comparatives. Among the inventive bi-component polymeric macrofibers, the INS bi-component polymeric macrofibers perform best.

TABLE 4

Pull-Out Data for Bi-Component Fibers

| Example | Fiber | Description | Interfacial Shear Stress (MPa) |
|---|---|---|---|
| 2 | INS 11X draw | Islands in a sea fiber 11X drawn | 2.1 |
| 3 | INS 9X draw | Islands in a sea fiber 9X drawn | 2.0 |
| 1D | Plain PP fiber | PP only drawn fiber | 0.7 |
| 2D | PP + PP-g-MAH (1.2 wt. % MAH @ 20 wt. % (11X draw) | Fiber of miscible blend of PP + PP-g-MAH(11X draw) | 0.9 |
| 4 | Sheath/Core 9X draw | Sheath/Core fiber draw 9X draw | 1.2 |

As shown in Table 5, below, the advantage exhibited in interfacial shear stress by the bi-component polymeric macrofibers of the present invention became much more significant at higher dosages (4.75 kg/m³).

TABLE 5

Interfacial Shear Stress in Pull Out of Bi-component Polymeric Macrofibers

| Example | Loading (kg/m³) | ARS (MPa) | StDev (MPa) |
|---|---|---|---|
| 3: INS (9:1 draw) Cut 5.12 cm (2") | 1.78 | 0.55 | 0.12 |
| 3 | 2.97 | 0.95 | 0.22 |
| 3 | 4.75 | 1.94 | 0.35 |
| 2: INS (11:1 draw) Cut 5.12 cm (2") | 1.78 | 0.57 | 0.43 |
| 2 | 2.97 | 1.01 | 0.06 |
| 2 | 4.75 | 1.78 | 0.40 |
| 4: sheath/core 9:1 draw | 1.78 | 0.51 | 0.13 |
| 4 | 2.97 | 0.84 | 0.53 |
| 4 | 4.75 | 1.61 | 0.13 |
| 2D: PP + Additive (11:1 draw) | 1.78 | 0.58 | 0.16 |
| 2D | 2.97 | 0.83 | 0.38 |
| 2D | 4.75 | 1.40 | 0.06 |

I claim:

1. A bi-component polymeric macrofiber composition for reinforcing concrete comprising as an outer component ethylene-vinyl alcohol (EVOH) polymer having from 5 mol % to 82.5 mol % of ethylene and having a weight average molecular weight of 50,000 to 10,000,000, and as a second component a polymer blend of, on one hand, polypropylene grafted with maleic anhydride and, on the other hand, polypropylene or polyethylene.

2. The bi-component polymeric macrofiber composition as claimed in claim 1, wherein the EVOH polymer has from 60 mol % to 82.5 mol % of ethylene.

3. The bi-component polymeric macrofiber composition as claimed in claim 1, wherein the polypropylene grafted with maleic anhydride in the second component of the bi-component polymeric macrofiber has a maleic anhydride proportion of from 0.06 to 0.25 wt. %, based on the total weight of the second component polymer blend solids.

4. The bi-component polymeric macrofiber composition as claimed in claim 3, wherein the polypropylene grafted with maleic anhydride in the second component of the bi-component polymeric macrofiber has a maleic anhydrideproportion of from 0.06 to 0.08 wt. %, based on the total weight of the second component polymer blend solids.

5. The bi-component polymeric macrofiber composition as claimed in claim 1, wherein the second component and the outer component of the bi-component polymeric macrofiber are situated in configuration chosen from second component islands in an outer component sea, second component core-outer component sheath, a segmented pie of the second component and the outer component, second component and outer component side by side, and fused microfilament fibers of each of the second component and the outer component.

6. The bi-component polymeric macrofiber composition as claimed in claim 1, further comprising a wet concrete mixture.

7. The bi-component polymeric macrofiber composition as claimed in claim 6 comprising from 0.002 wt. % to 0.4 wt. %, of the bi-component polymeric macrofibers, based on the total weight of the wet composition.

8. The bi-component polymeric macrofiber composition as claimed in claim 6 comprising from 0.006 to 0.25 wt. %, of the bi-component polymeric macrofibers, based on the total weight of the wet composition.

9. The bi-component polymeric macrofiber composition as claimed in claim 5, further comprising a wet concrete mixture.

10. A bi-component nonwoven comprising the bi-component polymeric macrofibers as claimed in claim 1, which bi-component nonwoven is continuous or non-continuous.

11. The bi-component polymeric macrofiber composition of claim 1, wherein the fibers comprise the two polymers in one of the following configurations: (a) an island in a sea configuration in the outer component; (b) oriented strands of each of the ethylene-vinyl alcohol outer component and the second component polymer in a segmented pie configuration; (c) a multilayer fiber comprising the outer component ethylene-vinyl alcohol and the second component side by side; or (d) a multilayer fiber comprising the second component polymer sandwiched between two layers of the outer component ethylene-vinyl alcohol polymer.

* * * * *